US012775168B2

(12) United States Patent
Molina et al.

(10) Patent No.: US 12,775,168 B2
(45) Date of Patent: Oct. 27, 2026

(54) PICTURE GENERATING UNIT

(71) Applicant: Dualitas Ltd, Milton Keynes (GB)

(72) Inventors: Daniel Molina, Milton Keynes (GB); Michael Spurr, Milton Keynes (GB); Gary Mills, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 0 days.

(21) Appl. No.: 18/673,884

(22) Filed: May 24, 2024

(65) Prior Publication Data

US 2024/0406354 A1 Dec. 5, 2024

(30) Foreign Application Priority Data

May 31, 2023 (GB) ..................................... 2308126

(51) Int. Cl.
*G02B 27/01* (2006.01)
*G03H 1/00* (2006.01)

(52) U.S. Cl.
CPC .. *G02B 27/0103* (2013.01); *G02B 2027/0187* (2013.01); *G03H 2001/0088* (2013.01)

(58) Field of Classification Search
CPC ........ G02B 27/0103; G02B 2027/0187; G02B 27/01; G02B 27/0101; G02B 2027/012; G03H 2001/0088; G03H 1/02; G03H 2001/2207; G03H 2001/2213; G03H 2001/2284; G03H 2223/12; G03H 2223/54; G03H 2225/60; G03H 1/2205;
(Continued)

(56) References Cited

U.S. PATENT DOCUMENTS

2011/0157483 A1 6/2011 Reichow et al.
2017/0023911 A1* 1/2017 Russell ................ G03H 1/0443
2020/0356050 A1* 11/2020 Lane .................. G02B 27/0093
(Continued)

FOREIGN PATENT DOCUMENTS

GB 2628579 A 10/2024

OTHER PUBLICATIONS

Examination Report under Section 18(3) issued on May 20, 2025 in GB 2308126.8 (4 pages).
(Continued)

*Primary Examiner* — Sahlu Okebato
(74) *Attorney, Agent, or Firm* — McDonnell Boehnen Hulbert & Berghoff LLP

(57) ABSTRACT

A picture generating unit comprises a display device arranged to display a hologram of a picture; and spatially modulate light in accordance with the displayed hologram to form a holographic reconstruction of the picture on a replay plane. The holographic reconstruction comprises a picture area and a non-picture area. The picture generating unit comprises an active mask in or downstream of the replay plane, the mask comprising a propagation area arranged to allow propagation of light along a projection axis, and a non-propagation area arranged to prevent propagation of light parallel to the projection axis. The propagation area and the non-propagation area share a boundary adjustable to change one or more physical parameters of the propagation area. The picture generating unit further comprises a drive means arranged to adjust the boundary to change the one or more physical parameters of the propagation area.

18 Claims, 9 Drawing Sheets

(58) Field of Classification Search
CPC .. G03H 1/2294; G03H 2226/05; H04N 9/312; H04N 9/3152; H04N 9/3194
See application file for complete search history.

(56) References Cited

U.S. PATENT DOCUMENTS

| | | | | |
|---|---|---|---|---|
| 2021/0141238 | A1 | 5/2021 | Pertierra et al. | |
| 2021/0191125 | A1* | 6/2021 | Li | G03H 1/2205 |
| 2021/0191320 | A1* | 6/2021 | Bledowski | G03H 1/2294 |
| 2022/0121028 | A1* | 4/2022 | Smeeton | G02B 27/0103 |
| 2022/0229398 | A1* | 7/2022 | Ma | G02B 7/1822 |

OTHER PUBLICATIONS

Combined Search and Examination Report issued on Dec. 13, 2023 in UK App. GB 2308126.8 (6 pages).

* cited by examiner

PICTURE GENERATING UNIT

CROSS-REFERENCE TO RELATED APPLICATIONS

This application claims priority under 35 U.S.C. § 119 to UK Patent Application GB 2308126.8 titled "Picture Generating Unit," filed on May 31, 2023. The entire contents of GB 2308126.8 are incorporated by reference herein for all purposes.

FIELD

The present disclosure relates to a picture generating unit for a holographic projection system, the picture generating unit comprising a reconfigurable shutter. More specifically, the present disclosure relates to a picture generating unit comprising a reconfigurable shutter having adjustable physical parameters for adjustably protecting a light receiving surface of the holographic projection system from sunlight. Some embodiments relate to a holographic projection system, picture generating unit and/or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUDs".

SUMMARY

Aspects of the present disclosure are defined in the appended independent claims.

In an aspect, there is provided a picture generating unit comprising a display device arranged to display a hologram of a picture and spatially modulate light in accordance with the displayed hologram to form a holographic reconstruction of the picture on a replay plane. The holographic reconstruction of the picture comprises a picture area and a non-picture area. The picture area may be considered an active area of the holographic reconstruction. The picture area may contain picture content intended to be projected by the picture generating unit and/or viewed by a user of the picture generating unit. The non-picture area may be considered a noise area of the holographic reconstruction. As such, the non-picture area may comprise noise. This noise may be an artefact of the hologram calculation process. The non-picture area may additionally comprise one or more features intended for use in control processes of the picture generating unit/a head-up display comprising the picture generating unit. The picture generating unit further comprises an active mask in or downstream of the replay plane. The active mask comprises a propagation area arranged to allow propagation of light along a projection axis of the picture generating unit, and further comprises a non-propagation area arranged to prevent propagation of light along the projection axis of the picture generating unit. In some embodiments, the picture generating unit is arranged to relay light towards an eye-box along the propagation axis. Thus, light from the picture area of the holographic reconstruction (which is allowed to propagate along the propagation axis via the propagation area of mask) may reach the eye-box. In other words, light associated with picture content will reach the eye-box and be visible to a user of the picture generating unit. Light from the non-picture/noise area of the holographic reconstruction (which is prevented from propagation along the projection axis by the non-propagation area of the mask) may not reach/may be prevented from reaching the eye-box. In other words, light associated with noise or other non-picture content such as control features may advantageously not be visible from the eye-box. The propagation area and the non-propagation area share a boundary. The boundary is adjustable such that one or more physical parameters of the propagation area (such as size or position) is/are changeable by adjustment of the boundary. Similarly one or more physical parameters of the non-propagation area is/are changeable by adjustment of the boundary. In other words, there may be an (adjustable) boundary between the propagation area and the non-propagation area. The propagation area may be considered a transmissive area of the active mask. The non-propagation area may be considered a non-transmissive area of the active mask. The picture generating unit further comprises a drive means arranged to adjust the boundary thereby to change the one or more physical parameter of the adjustable propagation area.

The inventors have recognised that the provision of an active mask, as described above, at or downstream of the replay plane can advantageously be used to mitigate or reduce the issues of overexposure and solar back-reflection at the replay plane. This is because masking the replay plane may reduce the amount of sunlight (or other ambient light) that may be incident on the replay plane (for example, on a light receiving surface forming the replay plane). Any sunlight (or other ambient light) incident on the replay plane may reduce the visibility or contrast of picture content in the picture content area of the holographic reconstruction. The mask may reduce the amount of ambient light that is incident on the replay plane. In particular, the inventors have recognised that the active mask can be adjusted such that the propagation area and non-propagation areas of the active mask track/follow/maintain alignment with the picture and non-picture areas of the holographic reconstruction, respectively. The inventors have recognised that the adjustability of the active mask means that, even if the picture and non-picture areas of the holographic reconstruction change in shape, size or position, the mask can be adjusted such that substantially only light from the picture areas of the holographic reconstruction (on the replay plane) may reach the eye-box while light from the non-picture areas of the holographic reconstruction (on the replay plane) may be prevented from reaching the eye-box. This may mean that a maximum amount of masking (including of ambient light) may be achieved for any given holographic reconstruction while allowing light from the picture content area to be relayed to an eye-box.

The picture generating unit of the present disclosure is a holographic picture generating unit, in that it forms a holographic reconstruction of a hologram on a replay plane. An advantage of such holographic systems is that the shape, size or position of the picture area on the replay plane can easily be changed by changing the hologram that is displayed. This is not typically an option for more conventional display technologies, such as TFT display technologies. The inventors have recognised that a benefit of being able to change the shape, position and size of the picture area on the relay plane is to allow for different viewing positions/different eye-box positions. For example, when the picture generating unit is provided as part of a head-up display for a vehicle, the head-up display may be arranged such that light from the picture area of the holographic reconstruction is relayed to an eye-box after a reflection off of an optical combiner such as a windscreen (or windshield). There may be a need for the eye-box to have different positions to accommodate for different positions (such as different heights) of a user/driver. This can be achieved by moving the picture area on the replay plane, thus light of the picture area is incident on a different portion of the optical combiner causing the eye-box to be formed at a different position/height. The shape of the picture area may also change. For example, this may be to compensate for the fact that light of the picture area is incident on different portions of the optical combiner. The optical combiner may have a complex shape. The holographic reconstruction (including the shape of the picture area of the holographic reconstruction) may be pre-distorted to compensate for the shape of the particular portion of the optical combiner that light (of the picture area) is relayed to. As the skilled reader will appreciate, if the portion of the optical combiner that receives relayed light is changed because of a change of the picture area on the replay plane, then the pre-distortion may also need to change such that the shape of the picture area on the replay plane may change as the position changes.

A non-adjustable (physical) mask on or downstream of the replay plane and comprising an aperture could be used to block light from the non-picture area of the reconstruction while allowing light from the picture area to propagate along a propagation axis (and reach the eye-box). However, the inventors have recognised that, because the shape, size and position of the picture area can change for holographic picture generating units, the aperture of the mask will need to be larger than the picture area of the holographic reconstruction so that light of the picture area is not blocked by the mask in all positions of the holographic reconstruction/picture area. However, this increases the amount of sunlight/ambient light that can pass through the mask to the replay plane which may reduce the visibility and contrast of the picture area. Furthermore, some light of the non-picture area (which, as above, may comprise noise) may propagate through the aperture of the mask and so may propagate to the eye-box. This may create an unwanted frame or border around the picture content when viewed from the eye-box and may also reduce image contrast. This effect is referred to as the so-called "post-card" effect. So, the inventors have identified that, for holographic picture generating units in which the picture area position, shape and/or size on the replay plane is changeable (unlike conventional head-up display systems), a non-adjustable physical mask is not acceptable. The inventors have recognised that the adjustable mask of the present disclosure solves these problems. In particular, the inventors have recognised that the adjustable mask of the present disclosure can reduce or minimise the so-called post-card effect while improving the contrast and visibility of the holographic reconstruction relayed to an eye-box by the picture generating unit.

The picture generating unit may comprise a user tracking system arranged to reposition picture content of the picture based on a determined position of a user.

The drive means may be arranged to adjust the boundary in response to an input from or via the user tracking system. Adjusting the boundary in such a way tends to advantageously allow for the one or more physical parameters of the propagation area to be changed by or via the user-tracking system of the picture generating unit.

The drive means may be arranged to adjust the boundary in response to an indication that the picture content has been repositioned by the user-tracking system. Adjusting the boundary in such a way tends to advantageously allow for the one or more physical parameters of the propagation area to be changed by the user-tracking system responsive to a repositioning of picture content, for example repeatedly or continuously.

The drive means may be arranged to adjust the boundary in response to an indicated position of the repositioned picture content. Adjusting the boundary in such a way tends to advantageously allow for the one or more physical parameters of the propagation area to be changed by the user-tracking system in a manner which corresponds to the repositioned picture content.

The drive means may be arranged to adjust the boundary in response to one or more user-tracking data processed by the user-tracking system in response to a change in the picture. Adjusting the boundary in such a way tends to advantageously allow for the one or more physical parameters of the propagation area to be changed responsive to a change in the picture, for example repeatedly or continuously.

The drive means may be arranged to adjust the boundary thereby to change at least one of: a size of the active mask, a shape of the active mask, a position of the active mask in the replay plane, and orientation of the active mask in the replay plane. Changing at least one of these physical parameters tends to allow for better matching of the propagation area of the active mask to the picture area of the holographic reconstruction, thereby improving the hologram quality. The hologram quality may be improved by mitigating issues such as overexposure, solar back-reflection, and the postcard effect. The problems of poor image visibility and lack of contrast thus tend to be reduced.

The drive means may be arranged to adjust the boundary such that said boundary is substantially aligned, along the projection axis, with a further boundary of the picture area of the holographic reconstruction, the further boundary being on the replay plane. The value of at least one of the one or more physical parameters of the propagation area may thereby be substantially matched with the value of at least one of a further one or more physical parameters of the picture area. The at least one of the one or more physical parameters of the propagation area may be a corresponding parameter to the at least one of the further one or more physical parameters of the picture area. Matching the physical parameters of the propagation area and picture area in this way tends to advantageously improve the hologram quality. The hologram quality may be improved by mitigating overexposure, solar back-reflection, and the postcard effect, and thus provide particularly enhanced visibility and contrast.

The drive means may be arranged to adjust the boundary such that the propagation area of the active mask is arranged to substantially allow the continued propagation of light of the picture area of the holographic reconstruction along the projection axis of the picture generating unit. The drive means may further be arranged to adjust the boundary such that the non-propagation area of the active mask is arranged to prevent the continued propagation of light of the non-picture area of the holographic reconstruction along the projection axis of the picture generating unit. Such an arrangement tends to enhance image visibility and mitigate loss of contrast.

The display device may be arranged to spatially modulate light in accordance with a first hologram of a first picture (at a first time) to form a holographic reconstruction of the first picture on the replay plane, the first holographic reconstruction comprising a first picture area and a first non-picture area. The display device may be further arranged to spatially modulate light in accordance with a second hologram of a second picture to form a second holographic reconstruction of the second picture on the replay plane (at a second time that is different to the first), the second holographic reconstruction comprising a second picture area and a second non-picture area. In other words, the display device may be arranged to display a sequence of holograms of a sequence of pictures.

At least one of a size, a position or an orientation of the first picture area of the first picture may be different to that of the second picture area of the second picture.

The drive means may be arranged to adjust the boundary of the active mask thereby to change the one or more physical parameters of the propagation area in response to a change in a second further one or more physical parameters of the second picture relative to a change in a first further one or more physical parameters of the first picture. Such a drive means tends to advantageously provide matching of the propagation area of the active mask to picture area during or following a change in one or more physical parameters of the picture, thereby providing mitigation of overexposure, solar back-reflection, and the postcard effect when one or more physical parameters of the picture to be generated change.

The drive means may be arranged to adjust the boundary thereby to change the one or more physical parameters of the propagation area in response to a change in at least one of a size, a position or an orientation of the second picture area of the second picture relative to that of the first picture area of the first picture. Such a drive means tends to advantageously provide matching of the propagation area of the active mask to the picture area during or following a change in size, position or orientation of a second picture relative to the first picture, thereby providing mitigation of overexposure, solar back-reflection, and the postcard effect when the second picture changes relative to the first picture.

The drive means may be arranged to adjust the boundary to be substantially aligned, along the projection axis, with a first further boundary of the first picture area of the first holographic reconstruction when the display device is arranged to spatially modulate light in accordance with the first hologram. The drive means may be further arranged to adjust the boundary to be substantially aligned, along the projection axis, with a second further boundary of the second picture area of the second holographic reconstruction when the display device is arranged to spatially modulate light in accordance with the second hologram. Such a drive means tends to advantageously provide for alignment of the propagation area with a different picture area dependent on the hologram selected. The problems of poor image visibility and lack of contrast thus tend to be reduced for any hologram in accordance with which the display device is arranged to spatially modulate light.

The user-tracking system may comprise an eye-tracking system arranged to track a current eye-box position of a user of the picture generating unit. Such an arrangement advantageously allows for conventional eye-boxes in picture generating devices to serve the further purpose of controlling or otherwise providing data to the drive means for adjusting the boundary of the propagation area.

The picture generating unit may be arranged such that the hologram that is displayed on the display device is selected based on the tracked current eye-box position of the user. Using the tracked current eye-box position to select the hologram displayed on the display device tends to advantageously allow a hologram to be selected corresponding to a desired holographic reconstruction determined by the user.

The picture generating unit may comprise a light receiving surface at the replay plane such that the holographic reconstruction formed is a real image of the picture formed on the light receiving surface. The light receiving surface may be a diffuser.

The holographic reconstruction may comprise a primary picture area and a secondary picture area, the primary picture area being a near field picture area and the secondary picture area being a far-field picture area. Provision of a primary picture area being a near field picture area and a secondary picture area being a secondary picture area tends to advantageously allow for either or both of near-field and far-field holographic reconstructions to be provided to the user. Both the near-field and far-field holographic reconstructions thus tend to benefit from improved image visibility and contrast.

The active mask may comprise a primary propagation area and a secondary propagation area. Each propagation area may be arranged to allow the continued propagation of light along the projection axis of the picture generating unit. Provision of a primary propagation area and a secondary propagation area tends to advantageously allow for each of the primary picture area and the secondary picture area to benefit from mitigation of the issues of overexposure and solar back-reflection.

The drive means may be further arranged to adjust the boundary in response to a further input from or via the user-tracking system, thereby to adjust a size of the propagation area to an area less than or equal to that of the non-propagation area, such that the active mask substantially prevents propagation of light along the projection axis of the picture generating unit. The drive means may be arranged to adjust the boundary in response to a further input from or via the user tracking system. The size of the propagation area may be adjusted to be less than or equal to 50% of a total area of the active mask. The size of the propagation area may be adjusted to be less than or equal to 40% of the total area of the active mask. The size of the propagation area may be adjusted to be less than or equal to 30% of the total area of the active mask. The size of the propagation area may be adjusted to be less than or equal to 20% of the total area of the active mask. The size of the propagation area may be adjusted to be less than or equal to 15% of the total area of the active mask. The size of the propagation area may be adjusted to be less than or equal to 10% of the total area of the active mask. The size of the propagation area may be adjusted to be less than or equal to 5% of the total area of the active mask. The size of the propagation area may be adjusted to be substantially zero. By reducing the size of the propagation area in a mode of operation, the replay plane is protected from overexposure to light. This method of restricting propagation of light along the projection axis advantageously eliminates the need for conventional mirrors to achieve similar effects, thereby removing the physical space requirement and cost associated with existing mechanisms.

In a further aspect, there is provided a holographic projection system comprising a picture generating unit according to any of the preceding claims. The holographic projection system further comprises a light-receiving surface defining the replay plane. Provision of an active mask at or downstream of the replay plane tends to advantageously result in a picture generating unit in which the issues of overexposure and solar back-reflection at the replay plane tend to be mitigated. The active mask comprises a propagation area and non-propagation area which share an adjustable boundary. By masking the non-picture area of the holographic reconstruction with the non-propagation area of the active mask, the hologram quality tends to be improved. By way of example, the hologram quality may be improved by mitigating the phenomenon known as “the postcard effect”. The problems of poor hologram quality such as poor image visibility and lack of contrast thus tend to be reduced.

In a yet further aspect, there is provided a method of operation of a picture generating unit. The method comprises displaying, by a display device of the picture generating unit, a hologram of a picture. The method further comprises spatially modulating, by the display device, light in accordance with the displayed hologram to form a holographic reconstruction of the picture on a replay plane. The holographic reconstruction of the picture comprises a picture area and a non-picture area. The method further comprises adjusting, by a drive means of the picture generating unit, a shared boundary between a propagation area of an active mask and a non-propagation area of the active mask, the active mask being in or downstream of the replay plane. The propagation area is arranged to allow propagation of light along a projection axis of the picture generating unit. The non-propagation area is arranged to prevent propagation of light along the projection axis of the picture generating unit. The adjusting the boundary thereby adjusts a physical parameter of the propagation area. Adjusting the boundary of the active mask in this way tends to advantageously result in mitigation of the issues of overexposure and solar back-reflection at the replay plane. By masking the non-picture area of the holographic reconstruction with the non-propagation area of the active mask, the phenomenon known as “the postcard effect” also tends to be mitigated. The problems of poor image visibility and lack of contrast thus tend to be reduced.

The picture generating may further comprise a user tracking system arranged to reposition picture content of the picture based on a determined position of a user. The adjusting, by the drive means, the boundary shared between the propagation area of the active mask and the non-propagation area of the active mask may comprise adjusting the boundary in response to an input from or via the user-tracking system. Adjusting the boundary in such a way tends to advantageously allow for the one or more physical parameters of the propagation area to be changed by or via the user-tracking system of the picture generating unit.

The adjusting, by the drive means, the boundary shared between the propagation area of the active mask and the non-propagation area of the active mask may comprise adjusting the boundary in response to an indication that the picture content has been repositioned by the user-tracking system. Adjusting the boundary in such a way tends to advantageously allow for the one or more physical parameters of the propagation area to be changed by the user-tracking system responsive to a repositioning of picture content, for example repeatedly or continuously.

The adjusting, by the drive means, the boundary shared between the propagation area of the active mask and the non-propagation area of the active mask may comprise adjusting the boundary in response to an indicated position of the repositioned picture content. Adjusting the boundary in such a way tends to advantageously allow for the one or more physical parameters of the propagation area to be changed by the user-tracking system in a manner which corresponds to the repositioned picture content.

The adjusting, by the drive means, the boundary shared between the propagation area of the active mask and the non-propagation area of the active mask may comprise adjusting the boundary in response to one or more user-tracking data processed by the user-tracking system in response to a change in the picture. Adjusting the boundary in such a way tends to advantageously allow for the one or more physical parameters of the propagation area to be changed responsive to a change in the picture, for example repeatedly or continuously.

The adjusting the boundary may thereby adjust at least one of: a size of the active mask, a shape of the active mask, a position of the active mask in the replay plane, and an orientation of the active mask in the replay plane. Changing at least one of these physical parameters tends to allow for better matching of the propagation area of the active mask to the picture area of the holographic reconstruction, thereby improving mitigation of the issues of overexposure, solar back-reflection, and the postcard effect. The problems of poor image visibility and lack of contrast thus tend to be reduced.

The adjusting, by the drive means, the boundary may further comprise adjusting, by the drive means, the boundary to be substantially aligned, along the projection axis, with a further boundary of the picture area of the holographic reconstruction, the further boundary being on the replay plane. The value of at least one of the one or more physical parameters of the propagation area may thereby be substantially matched with the value of at least one of a further one or more physical parameters of the picture area. The at least one of the one or more physical parameters of the propagation area may be a corresponding parameter to the at least one of the further one or more physical parameters of the picture area. Matching the physical parameters of the propagation area and picture area in this way tends to advantageously improve mitigation of overexposure, solar back-reflection, and the postcard effect, providing particularly enhanced visibility and contrast.

The adjusting, by the drive means, the boundary may comprise adjusting, by the drive means, the boundary such that the propagation area of the active mask is arranged to substantially allow the continued propagation of light of the picture area of the holographic reconstruction along the projection axis of the picture generating unit. The adjusting, by the drive means, the boundary may further comprise adjusting, by the drive means, the boundary such that the non-propagation area of the active mask is arranged to prevent the continued propagation of light of the non-picture area of the holographic reconstruction along the projection axis of the picture generating unit. Such adjustment of the propagation area and non-propagation areas by adjustment of the boundary tends to enhance image visibility and mitigate loss of contrast.

The method may comprise spatially modulating light in accordance with a first hologram of a first picture to form a holographic reconstruction of the first picture on the replay plane, the first holographic reconstruction comprising a first picture area and a first non-picture area. The method may further comprise spatially modulating light in accordance with a second hologram of a second picture to form a second holographic reconstruction of the second picture on the replay plane, the second holographic reconstruction comprising a second picture area and a second non-picture area. Spatially modulating light in such a way tends to advantageously allow for the image of improved visibility and contrast produced by the picture generating unit to be changed or updated.

At least one of a size, a position or an orientation of the first picture area of the first picture may be different to that of the second picture area of the second picture.

The adjusting, by the drive means, the boundary may comprise adjusting the boundary thereby to change the one or more physical parameters of the propagation area in response to a change in a second further one or more physical parameters of the second picture relative to a change in a first further one or more physical parameters of the first picture. Such adjustment tends to advantageously provide matching of the propagation area of the active mask to picture area during or following a change in one or more physical parameters of the picture, thereby providing mitigation of overexposure, solar back-reflection, and the postcard effect when one or more physical parameters of the picture to be generated change.

The adjusting, by the drive means, the boundary may comprise adjusting the boundary thereby to the change one or more physical parameters of the propagation area in response to a change in at least one of a size, a position or an orientation of the second picture area of the second picture relative to that of the first picture area of the first picture. Such adjustment tends to advantageously provide matching of the propagation area of the active mask to the picture area during or following a change in size, position or orientation of a second picture relative to the first picture, thereby providing mitigation of overexposure, solar back-reflection, and the postcard effect when the second picture changes relative to the first picture.

The adjusting, by the drive means, the boundary may comprise adjusting the boundary to be substantially aligned, along the projection axis, with a first further boundary of the first picture area of the first holographic reconstruction when the display device is arranged to spatially modulate light in accordance with the first hologram. The adjusting, by the drive means, the boundary may comprise adjusting the boundary to be substantially aligned, along the projection axis, with a second further boundary of the second picture area of the second holographic reconstruction when the display device is arranged to spatially modulate light in accordance with the second hologram. Such a adjustment tends to advantageously provide for alignment of the propagation area with a different picture area dependent on the hologram selected. The problems of poor image visibility and lack of contrast thus tend to be reduced for any hologram in accordance with which the display device is arranged to spatially modulate light.

The method may further comprise tracking, by a user tracking system of the picture generating unit, a current eye-box position of a user of the picture generating unit. This tends to advantageously allow for conventional eye-boxes in picture generating devices to serve the further purpose of controlling or otherwise providing data to the drive means for adjusting the boundary of the propagation area.

The method may further comprise, prior to the displaying, by the display device, the hologram of the picture, selecting, based on the tracked current eye-box position of the user, the hologram of the picture to be displayed. Using the tracked current eye-box position to select the hologram displayed on the display device tends to advantageously allow a hologram to be selected corresponding to a desired holographic reconstruction determined by the user.

The method may further comprise forming a real image of the picture on a light receiving surface the replay plane. The light receiving surface may be a diffuser.

The holographic reconstruction may comprise a primary picture area and a secondary picture area, the primary picture area being a near field picture area and the secondary picture area being a far-field picture area. Provision of a primary picture area being a near field picture area and a secondary picture area being a secondary picture area tends to advantageously allow for either or both of near-field and far-field holographic reconstructions to be provided to the user. Both the near-field and far-field holographic reconstructions thus tend to benefit from improved image visibility and contrast.

The active mask may comprise a primary propagation area and a secondary propagation area. Each propagation area may be arranged to allow the continued propagation of light along the projection axis of the picture generating unit. Provision of a primary propagation area and a secondary propagation area tends to advantageously allow for each of the primary picture area and the secondary picture area to benefit from mitigation of the issues of overexposure and solar back-reflection.

The adjusting, by the drive means, the boundary may comprise adjusting the boundary thereby to adjust a size the propagation area to an area less than that of the non-propagation area, such that the active mask substantially prevents propagation of light along the projection axis of the picture generating unit. The adjusting, by the drive means, the boundary may comprise adjusting the boundary in response to a further input from or via the user tracking system. The size of the propagation area may be adjusted to be less than or equal to 50% of a total area of the active mask. The size of the propagation area may be adjusted to be adjusted to be less than or equal to 40% of the total area of the active mask. The size of the propagation area may be adjusted to be less than or equal to 30% of the total area of the active mask. The size of the propagation area may be adjusted to be less than or equal to 20% of the total area of the active mask. The size of the propagation area may be adjusted to be less than or equal to 15% of the total area of the active mask. The size of the propagation area may be adjusted to be less than or equal to 10% of the total area of the active mask. The size of the propagation area may be adjusted to be less than or equal to 5% of the total area of the active mask. The size of the propagation area may be adjusted to be substantially zero. By reducing the size of the propagation area in a mode of operation, the replay plane is protected from overexposure to light. This method of restricting propagation of light along the projection axis advantageously eliminates the need for conventional mirrors to achieve similar effects, thereby removing the physical space requirement and cost associated with existing mechanisms.

In the present disclosure, the term “replica” is merely used to reflect that spatially modulated light is divided such that a complex light field is directed along a plurality of different optical paths. The word “replica” is used to refer to each occurrence or instance of the complex light field after a replication event—such as a partial reflection—transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term “replica” is independent of propagation distance and so the two branches or paths of light associated with a replication event are still referred to as “replicas” of each other even if the branches are a different length, such that the complex light field has evolved differently along each path. That is, two complex light fields are still considered “replicas” in accordance with this disclosure even if they are associated with different propagation distances-providing they have arisen from the same replication event or series of replication events.

A “diffracted light field” or “diffractive light field” in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a “diffracted light field” is a light field that forms a reconstruction on a plane spatially separated from the corresponding diffractive structure. An optical system is disclosed herein for propagating a diffracted light field from a diffractive structure to a viewer. The diffracted light field may form an image.

The term “hologram” is used to refer to the recording which contains amplitude information or phase information, or some combination thereof, regarding the object. The term “holographic reconstruction” is used to refer to the optical reconstruction of the object which is formed by illuminating the hologram. The system disclosed herein is described as a “holographic projector” because the holographic reconstruction is a real image and spatially-separated from the hologram. The term “replay field” is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term “replay field” should be taken as referring to the zeroth-order replay field. The term “replay plane” is used to refer to the plane in space containing all the replay fields. The terms “image”, “replay image” and “image region” refer to areas of the replay field illuminated by light of the holographic reconstruction. In some embodiments, the “image” may comprise discrete spots which may be referred to as “image spots” or, for convenience only, “image pixels”.

The terms “encoding”, “writing” or “addressing” are used to describe the process of providing the plurality of pixels of a spatial light modulator with a respective plurality of control values which respectively determine the modulation level of each pixel. It may be said that the pixels of the spatial light modulator are configured to “display” a light modulation distribution in response to receiving the plurality of control values. Thus, the spatial light modulator may be said to “display” a hologram and the hologram may be considered an array of light modulation values or levels.

It has been found that a holographic reconstruction of acceptable quality can be formed from a “hologram” containing only phase information related to the Fourier transform of the original object. Such a holographic recording may be referred to as a phase-only hologram. Embodiments relate to a phase-only hologram but the present disclosure is equally applicable to amplitude-only holography, in which a holographic reconstruction of acceptable quality can be formed from a “hologram” containing only amplitude information related to the Fourier transform of the original object.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for “phase-delay”. That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term “grey level” may be used to refer to the plurality of available modulation levels. For example, the term “grey level” may be used for convenience to refer to the plurality of available phase levels in a phase-only modulator even though different phase levels do not provide different shades of grey. The term “grey level” may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described herein by way of example only, with reference to the following figures.

The same reference numbers will be used throughout the drawings and the descriptions thereof to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Figure 1:
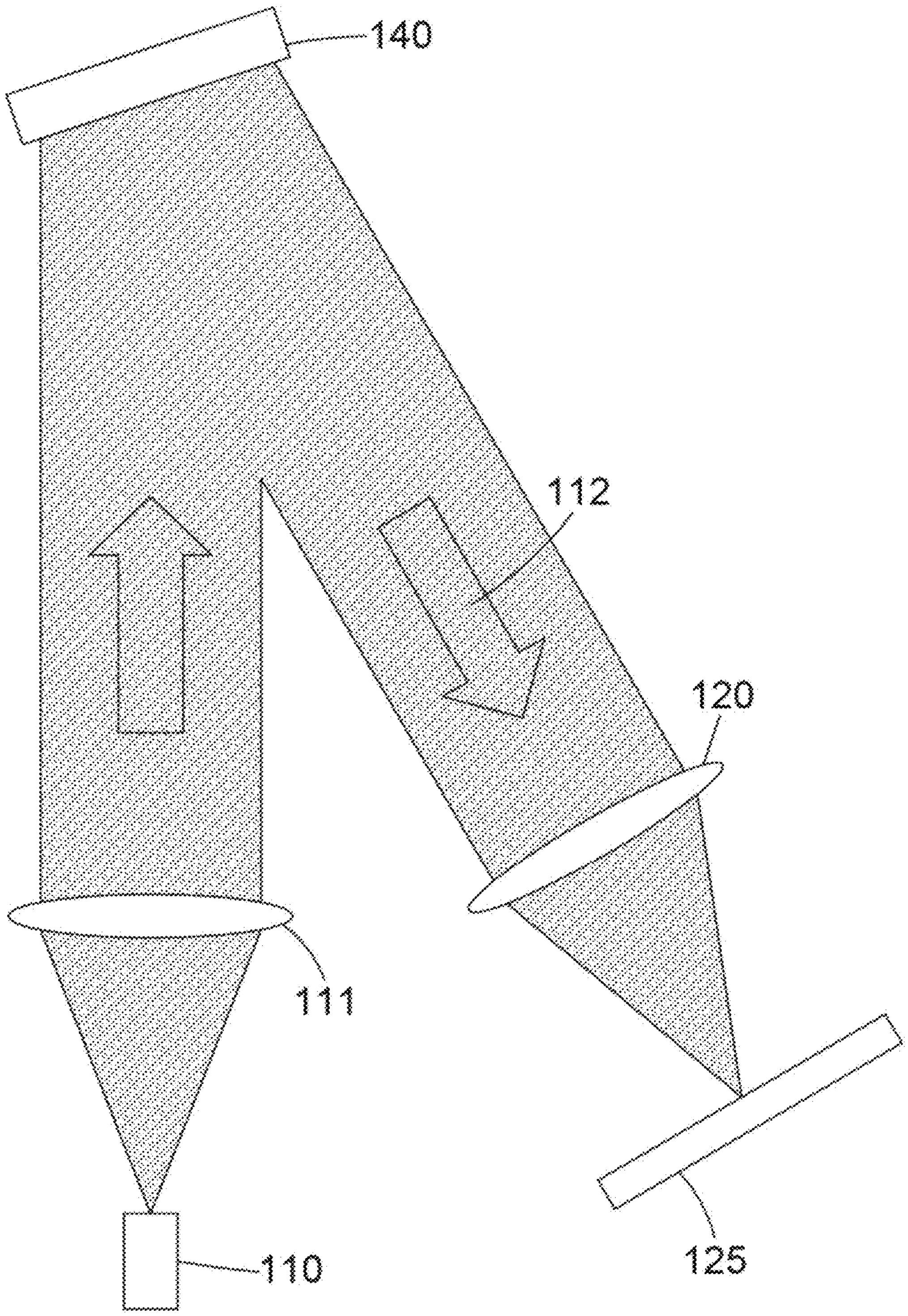
FIG. 1 is a schematic illustration depicting a reflective spatial light modulator producing a holographic reconstruction on a screen.

FIG. 1 depicts an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the spatial light modulator (SLM) 140 via a collimating lens 111. The collimating lens causes a generally planar wavefront of light to be incident to the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, IA(x, y) and IB(x, y), in the planes A and B respectively, are known and IA(x, y) and IB(x, y) are related by a single Fourier transform. With the given intensity cross-sections, an approximation to the phase distribution in the planes A and B, ψA(x, y) and ψB(x, y) respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. A computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information ψ[u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
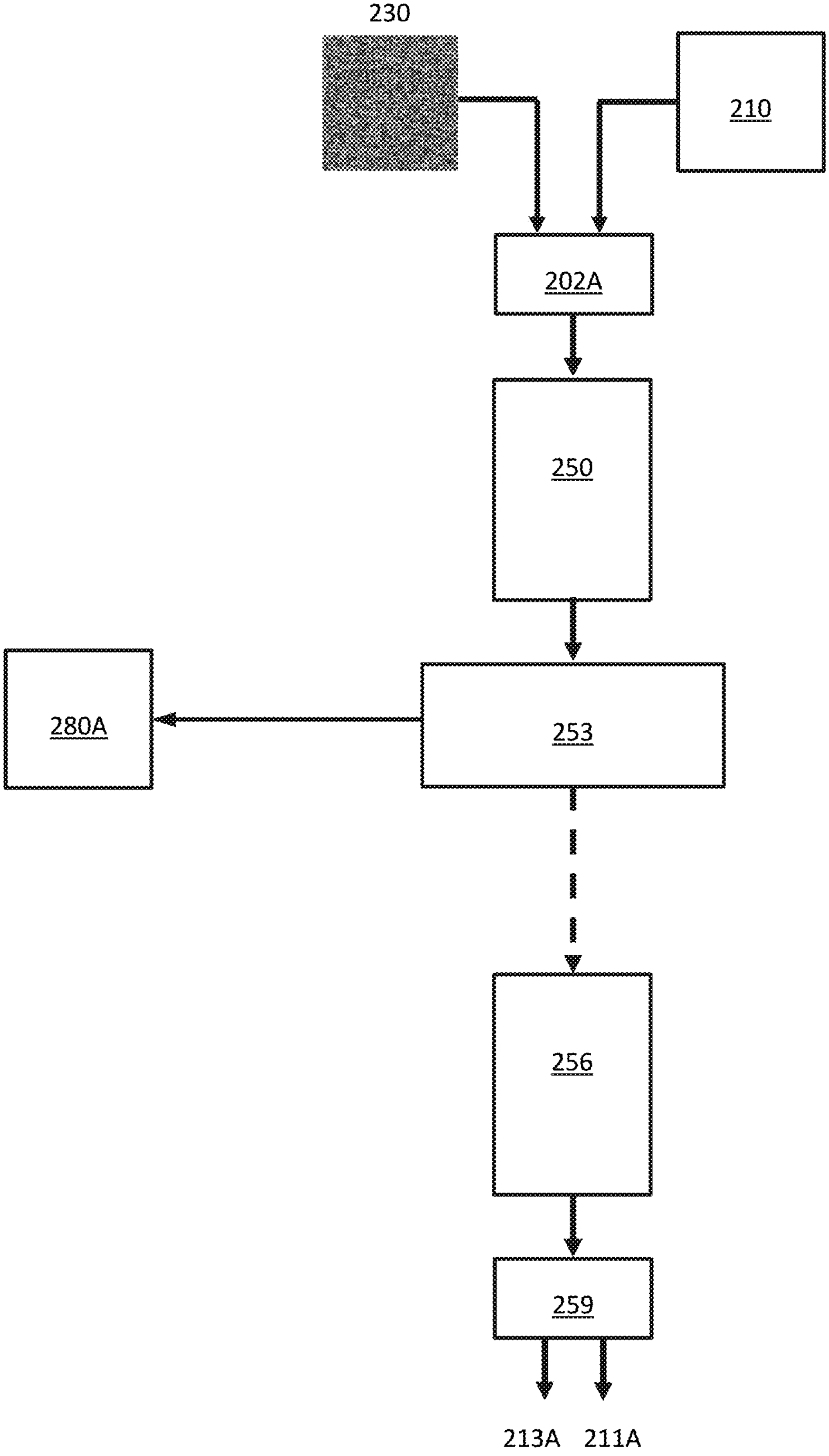
FIG. 2A is a flow diagram depicting a first iteration of an example Gerchberg-Saxton type algorithm.

FIG. 2A depicts the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
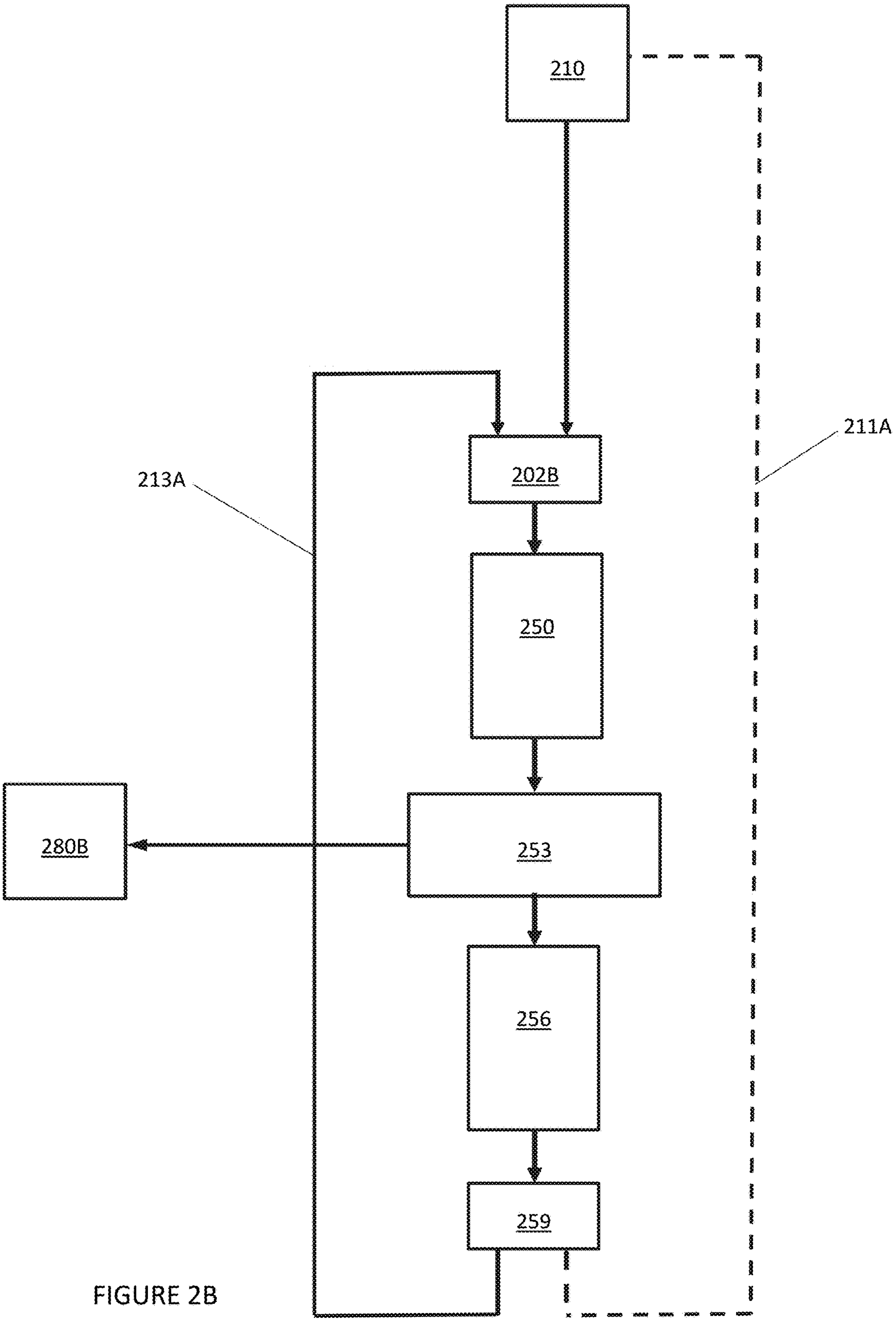
FIG. 2B is a flow diagram depicting second and subsequent iterations of the example Gerchberg-Saxton type algorithm.

FIG. 2B depicts a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
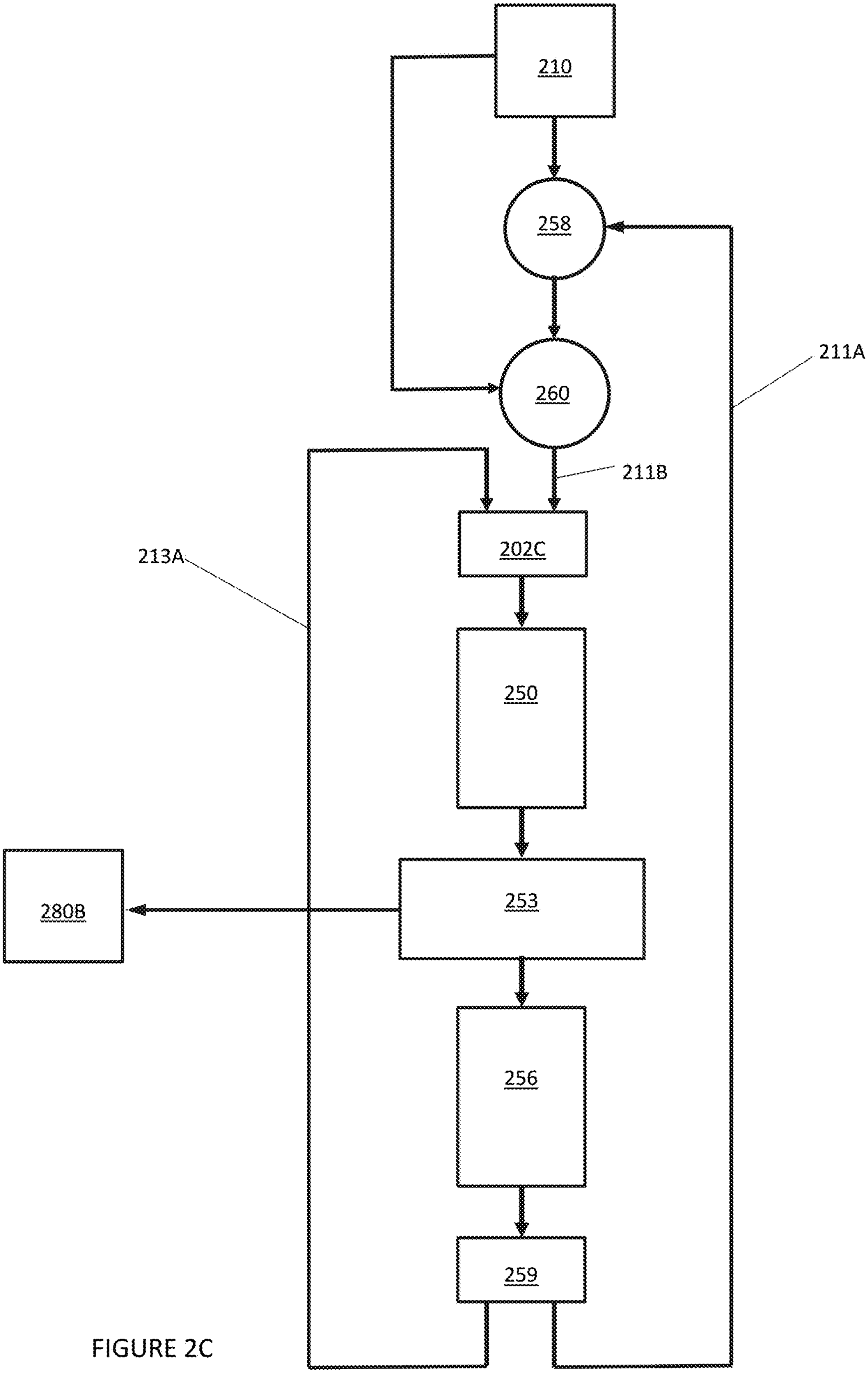
FIG. 2C is a flow diagram depicting alternative second and subsequent iterations of the example Gerchberg-Saxton type algorithm.

FIG. 2C depicts an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively provide a plurality of light modulation levels. That is, each liquid crystal cell is configured at any one time to operate at one light modulation level selected from a plurality of possible light modulation levels. Each liquid crystal cell is dynamically reconfigurable to a different light modulation level from the plurality of light modulation levels. In some embodiments, the spatial light modulator is a reflective LCOS spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. A LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
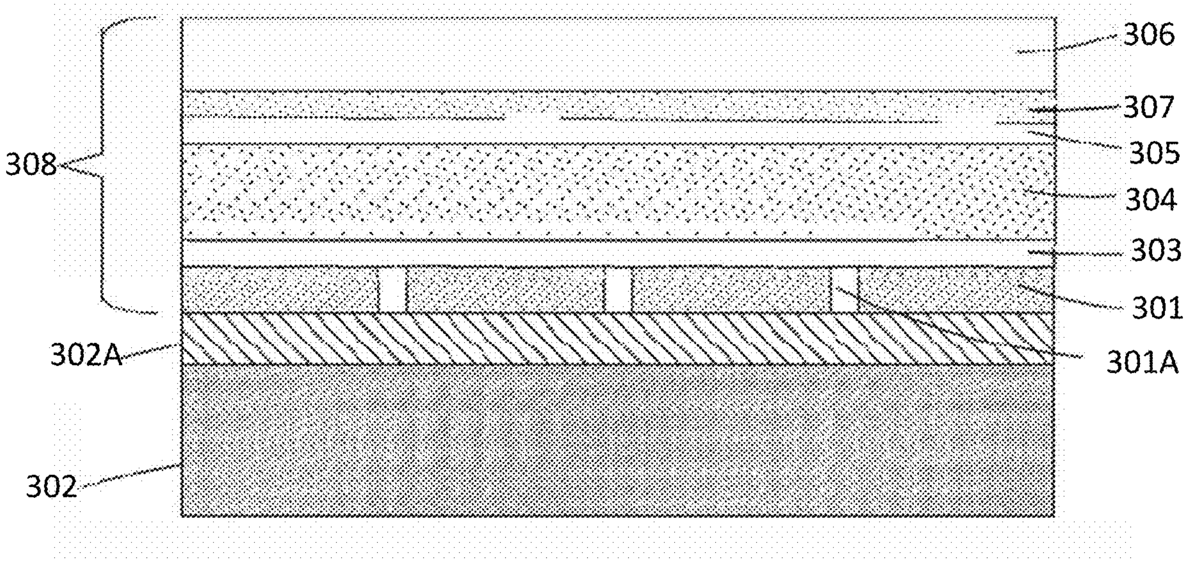
FIG. 3 is a schematic illustration depicting a reflective Liquid Crystal on Silicon spatial light modulator.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on a planar transparent layer 306, e.g. of glass. A single transparent electrode 307 e.g. of indium tin oxide is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wave-front, i.e. such that no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images).

However, the teachings of the present disclosure may equally be implemented using a transmissive LCOS SLM.

Figure 4:
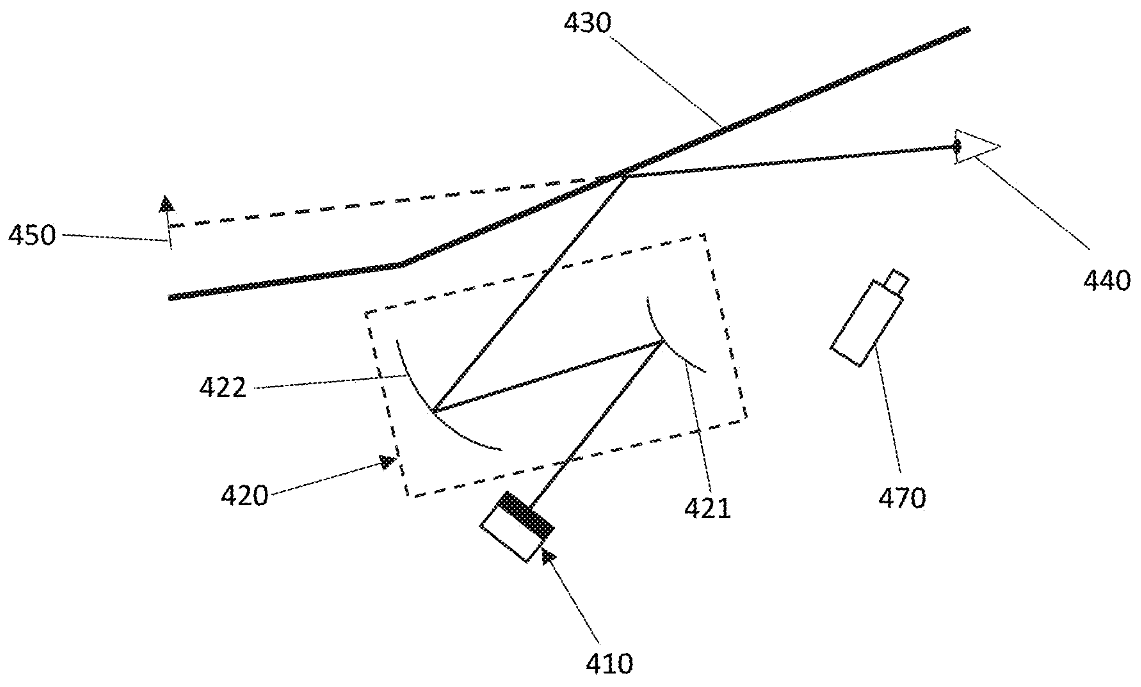
FIG. 4 is a schematic illustration depicting an example HUD in a vehicle.

FIG. 4 depicts a HUD in a vehicle such as a car. The windscreen 430 and bonnet (or hood) 435 of the vehicle are shown in FIG. 4. The HUD comprises a picture generating unit, "PGU", 410 and an optical system 420.

In this example, the PGU 410 comprises a light source, a light receiving surface and a processor (or computer) arranged to computer-control the image content of the picture. The PGU 410 is arranged to generate a picture, or sequence of pictures, on a light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path (or first optical path component) from the input to the second mirror 422 and a second optical path (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incidence upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output in order to increase the optical path length without overly increasing the physical size of the HUD.

The picture formed on the light receiving surface of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors together allow for suitable magnification of the virtual image of the picture.

The HUD further comprises a user tracking system in the form of eye-tracking device 470. The eye-tracking device 470 is arranged to detect the position of the eye(s) of the user 440.

In some embodiments, the PGU 410 comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

The present inventors have recognised that, in a HUD system with an intermediate image plane (such as in traditional thin-film-transistor-based, or holographic augmented reality, HUDs), the physical surface corresponding to this plane, which may be a diffuser or light-receiving surface, can illicit two particular issues. One such issue is back-reflection of sunlight to the eye-box when the position of the sun in the sky aligns with a projection axis of the HUD system. This tends to reduce the visibility and contrast of the HUD image. This can be reduced using a physical (stationary) mask. However, there a limitations on the amount of ambient light that such a mask can block when the holographic reconstruction is moveable on the replay plan. This is because the physical (stationary) mask must be large enough to accommodate all positions of the holographic reconstruction (specifically, the picture area of the holographic reconstruction). This can lead to a further issue known as the 'postcard effect', whereby some light is visible from outside the active image area, e.g. light associated with a noise area of the holographic reconstruction. This tends to create an unwanted frame or border around the HUD image, thereby reducing image contrast. This is explained in more detail in relation to FIGS. 5 and 6.

Figure 5:
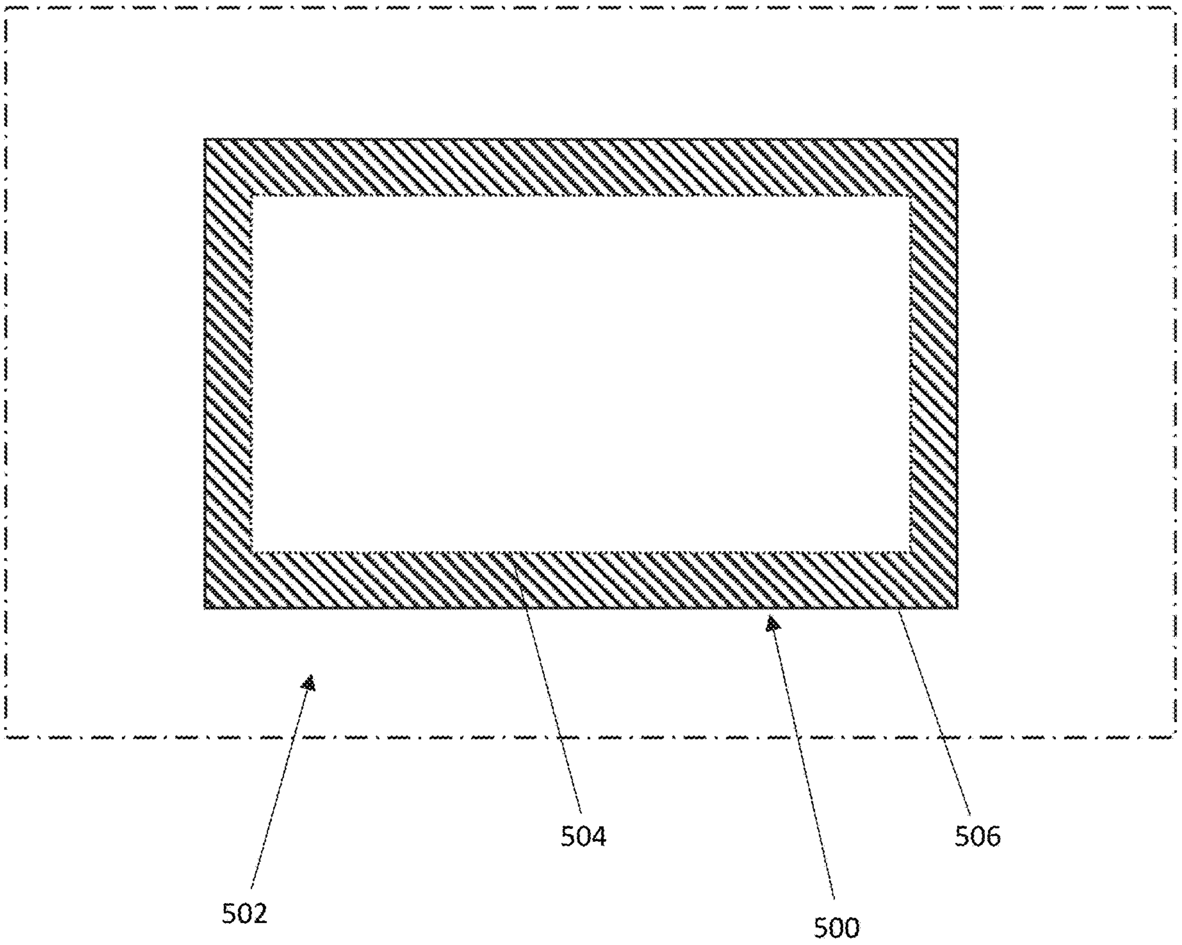
FIG. 5 is a schematic illustration depicting a holographic reconstruction formed at a replay plane.

FIG. 5 depicts a holographic reconstruction 500 formed at a replay plane which, in this example, is defined by a light-receiving surface 502. The holographic reconstruction 500 comprises a picture area 504 and a noise, or non-picture, area 506. The holographic reconstruction 500 may be formed within a picture generating unit and/or a holographic projection system.

Figure 6A:
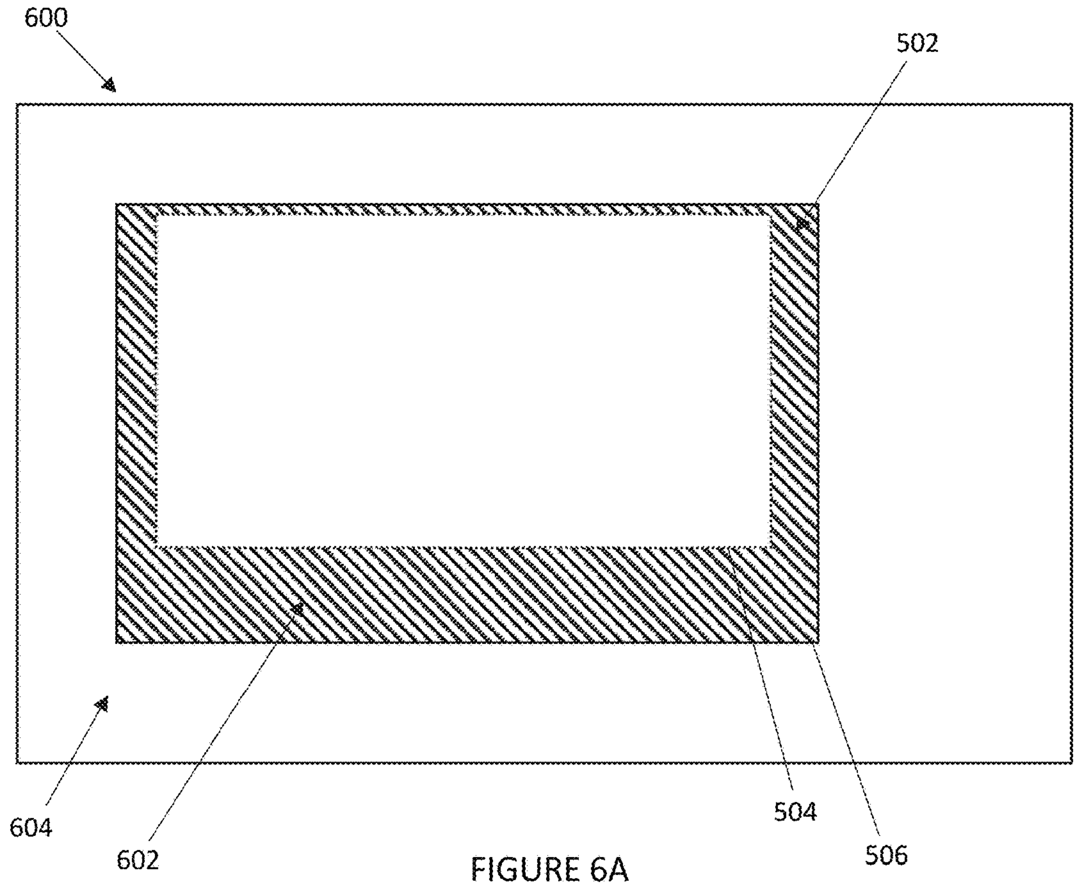
FIG. 6A is a schematic illustration depicting a non-adjustable mask downstream of the replay plane, the replay plane accommodating a picture area of the holographic reconstruction, the picture area being in a first position.

FIG. 6A depicts a non-adjustable mask 600 downstream of the replay plane defined by the light-receiving surface 502. The non-adjustable mask 600 may be implemented within a picture generating unit and/or a holographic projection system. In the depiction of FIG. 6A, the picture area 504 of the holographic reconstruction 500 is in a first position.

The non-adjustable mask 600 comprises a transmissive area, or propagation area, 602 which allows the propagation of light along a projection axis substantially perpendicular to the replay plane. When the picture area 504 is in the first position, the transmissive area 602 of the non-adjustable mask 600 is substantially aligned with the picture area 504 along the projection axis, thereby allowing the picture area 504 to be viewed along the projection axis by a user.

The non-adjustable mask 600 further comprises a non-transmissive, or non-propagation area, 604 which prevents the propagation of light in a direction parallel to the projection axis. When the picture area 504 is in the first position, the non-transmissive area 604 of the non-adjustable mask 600 is substantially aligned with the noise area 506 along a direction parallel to the projection axis, thereby at least partially preventing view of the noise area 506 along the projection axis by a user.

Thus, in use, the non-adjustable mask 600 allows view of the picture area 504 of the holographic reconstruction 500 while at least partially obscuring view of the noise area 506 of the holographic reconstruction 500.

Figure 6B:
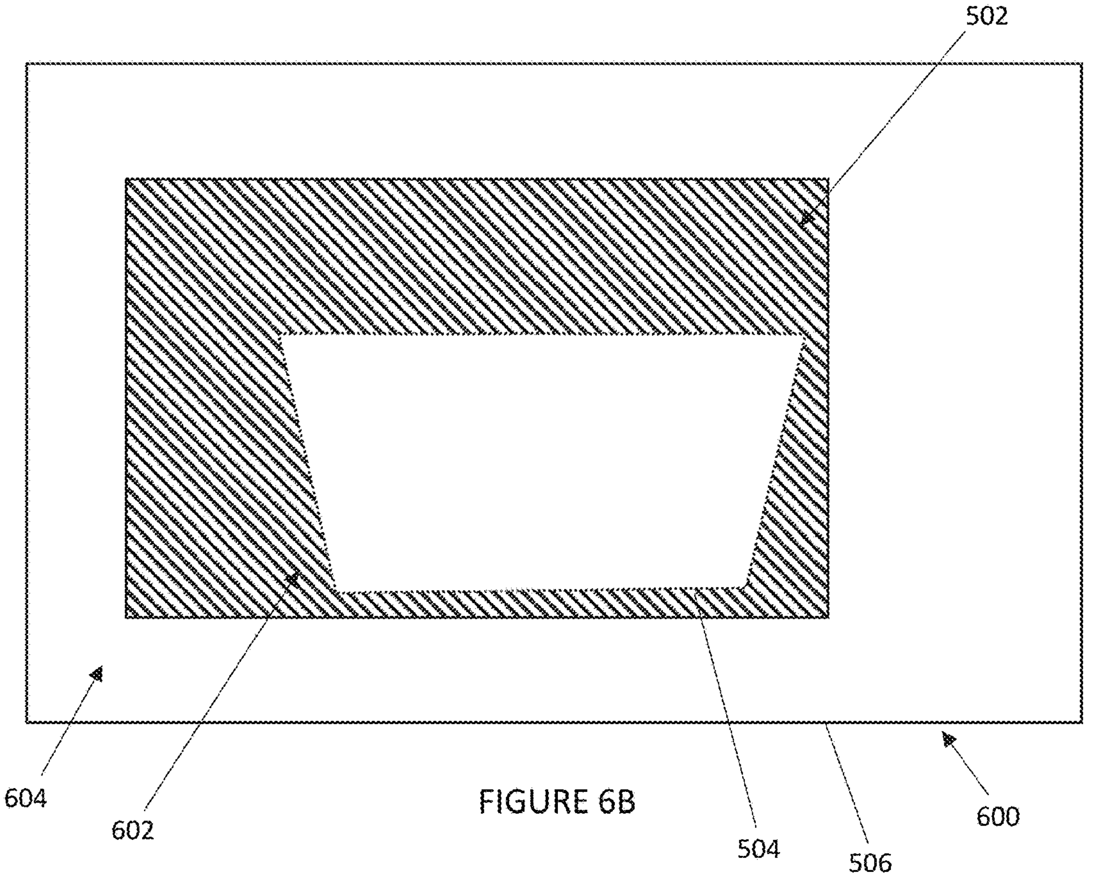
FIG. 6B is a schematic illustration depicting the non-adjustable mask downstream of the replay plane, the replay plane accommodating the picture area of the holographic reconstruction, the picture area being in a second position.

FIG. 6B depicts the non-adjustable mask 600 downstream of the replay plane defined by the light-receiving surface 502. In the depiction of FIG. 6B, the picture area 504 of the holographic reconstruction 500 is in a second position. In this embodiment, the picture area 504 in the second position defines a different shape and/or size to the picture area 504 in the first position. In other embodiments, only the position, and no other physical parameter, of the picture area 504 differs between the first and second positions. In yet other embodiments, a physical parameter other than position, shape, and or size of the picture area 504 differs between the first and second positions.

When the picture area 504 is in the second position, the picture area 504 is again viewable along the projection axis by a user.

When the picture area 504 is in the second position, a substantial portion of the noise area 506 is viewable, i.e. is not obstructed from view by the non-transmissive area 604, along the projection axis by a user.

FIGS. 6A and 6B serve to illustrate the problem that, where non-adjustable, i.e. fixed, masks are used to block the noise area of a holographic reconstruction, but the picture area is moveable or has physical parameters which are otherwise variable (e.g., to accommodate changes in eye-box position), the opening of the non-adjustable mask must be larger than the picture are to account for said movement or change in physical parameters. As a result, in holographic picture generating units employing non-adjustable masks, noise is likely to be viewable, to a varying extent, through the mask, resulting in decreased picture quality and contrast. The loss of image quality and contrast tends to be particularly great in cases where the picture area in the second position differs substantially in one or more physical parameters (e.g., size and/or shape) from the picture area in the first position, since the leak of noise through the mask is substantial in such cases.

Figure 7A:
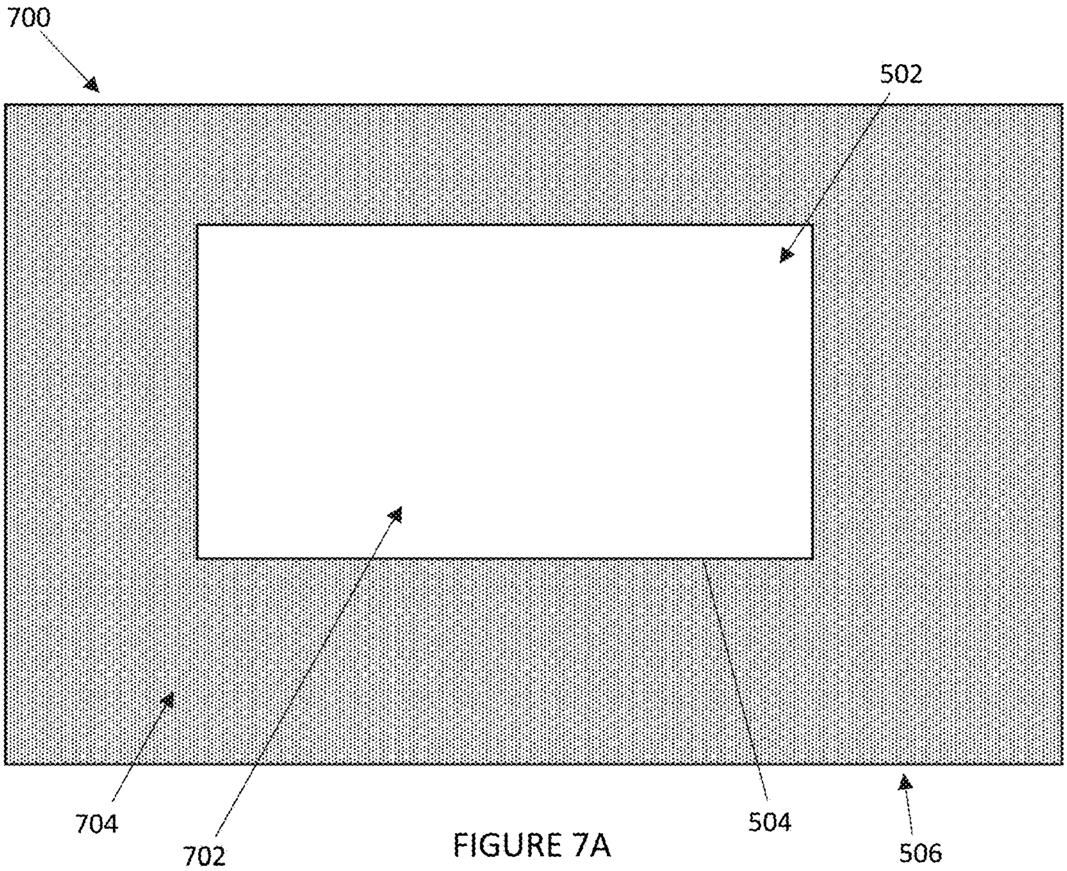
FIG. 7A is a schematic illustration of an adjustable, i.e. active, mask downstream of the replay plane, the replay plane accommodating the picture area of the holographic reconstruction, the picture area having a first set of physical parameters.

FIG. 7A depicts an adjustable, i.e. active, mask 700 downstream of the replay plane defined by the light-receiving surface 502. The adjustable, i.e. active, mask 700 may be implemented within a picture generating unit and/or a holographic projection system. In the depiction of FIG. 7A, the picture area 504 has a first set of physical parameters.

The adjustable mask 700 comprises a transmissive area, or propagation area, 702 which allows the propagation of light along a projection axis substantially perpendicular to the replay plane. When the picture area 504 is in the first position, the transmissive area 702 of the adjustable mask 700 is substantially aligned with the picture area 504 along the projection axis, thereby allowing the picture area 504 to be viewed along the projection axis by a user.

The adjustable mask 700 further comprises a non-transmissive, or non-propagation area, 704 which prevents the propagation of light in a direction parallel to the projection axis. When the picture area 504 is in the first position, the non-transmissive area 704 of the adjustable mask 700 is substantially aligned with the noise area 506 along a direction parallel to the projection axis, thereby at least partially preventing view of the noise area 506 along the projection axis by a user.

Thus, in use, the adjustable mask 700 allows view of the picture area 504 of the holographic reconstruction 500 while at least partially obscuring view of the noise area 506 of the holographic reconstruction 500.

The transmissive area 702 of the adjustable mask 700 and the non-transmissive area 704 of the non-adjustable mask 700 share a boundary 706. The boundary is configured to be adjusted, e.g. driven by a drive means, such that one or more physical parameters of the boundary may be varied. For example, a size and/or shape and/or perimeter of the boundary 706 may be changed, thereby to vary correspondingly one or more physical parameters of the transmissive area 702 and a further one or more physical parameters of the non-transmissive area 704.

Figure 7B:
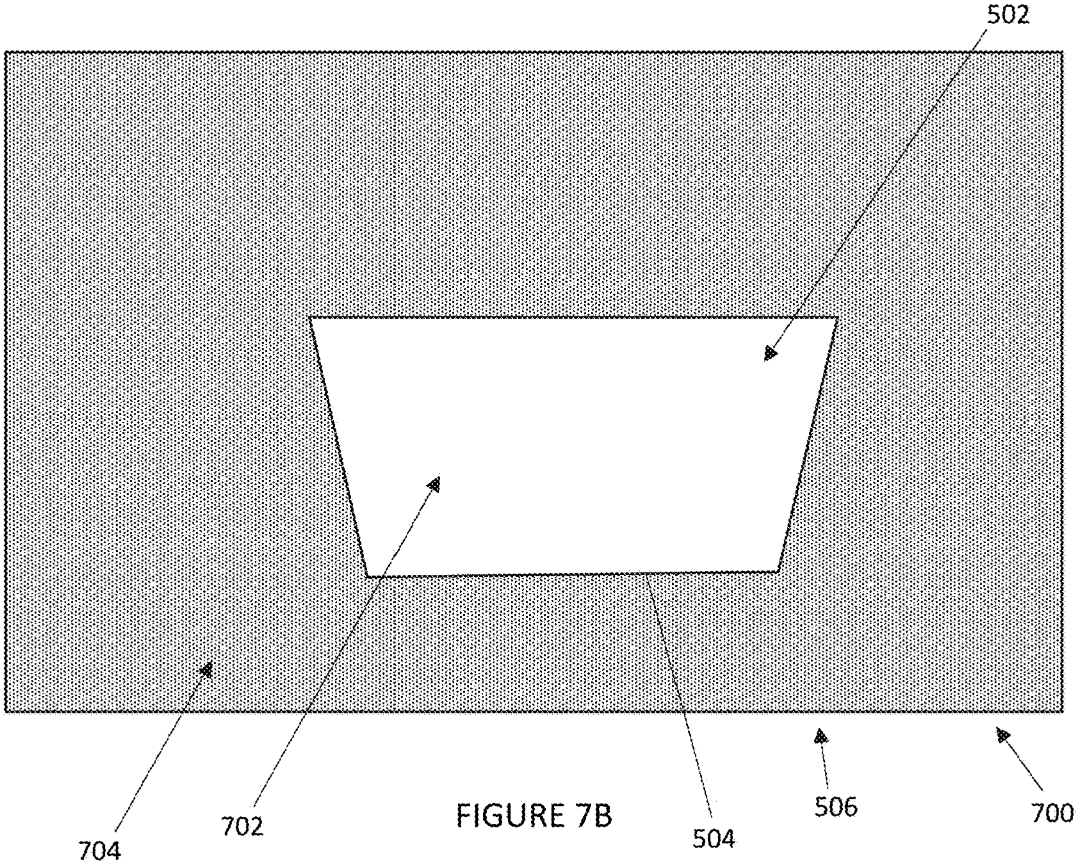
FIG. 7B is a schematic illustration of an adjustable, i.e. active, mask downstream of the replay plane, the replay plane accommodating the picture area of the holographic reconstruction, the picture area having a second set of physical parameters.

To illustrate this mode of operation, FIG. 7B depicts the adjustable, i.e. active, mask 700 downstream of the replay plane defined by the light-receiving surface 502. In the depiction of FIG. 7B, the picture area 504 has a second set of physical parameters. In particular, in this embodiment, the picture area 504 as depicted in FIG. 7B has a different size and shape to that depicted in FIG. 7A.

To adopt the configuration depicted in FIG. 7B from a starting configuration depicted in FIG. 7A, the boundary 706 is adjusted, i.e. driven, e.g. by a drive means, thereby to change one or more of its physical parameters. In particular, in this embodiment, the size and shape of the transmissive area 702, which may be considered an aperture of the reconfigurable shutter, is thereby adjusted to match an outline of the picture area 504 as it changes. Effectively, the reconfigurable shutter, or more specifically the transmissive area 702, may be considered to "follow", in real-time, the picture area 504 as it changes its set of physical parameters on the replay plane.

The changing of a set of physical parameters of the picture area 504 may be monitored or determined, for example, by monitoring or determining a position of the driver's eyes within an eyebox of the HUD, e.g. via a driver monitoring system such as the eye-tracking device 470 of FIG. 4. Such a monitoring system may already be provided as a separate entity within the vehicle, or integrated as a part of the HUD unit. From the determined eye position data, the position and/or shape, or indeed any of the first set or second set of physical parameters of the picture area 504 of the embodiment of FIGS. 7A and 7B, of the picture area 504 at a particular moment may be determined.

Furthermore, in the embodiment of FIGS. 7A and 7B, in cases where content in the HUD image is not displayed at regions at or proximate the periphery of the picture area 504, the size of the shutter aperture, i.e. the transmissive area 702, may be additionally reduced, and/or its shape adjusted, such that only the graphics located in a central region of the picture area 504 are transmitted.

In this and other embodiments, where it is envisaged by the user or manufacturer that only a position of the transmissive area 702 needs to change, the adjustable mask 700 may be a moveable plate with an aperture formed therewithin, the aperture defining the transmissive area 702.

In this and other embodiments, where it is envisaged by the user or manufacturer that more than position needs to change, e.g. size and/or shape and/or a further physical parameter needs to be changed, then the adjustable mask 700 may comprise a component such as a liquid crystal device or micro-mechanical system. Such a component may be considered an active component which responds to inputs so as to change its size and/or shape and/or a further physical parameter.

For example, a liquid crystal device for use as an active component may comprise, for example, an array of liquid crystal cells each controllable between a first (transmissive) state and a second (non-transmissive) state. The respective state of each cell could be selected to either block a portion of the noise area or allow transmission of light from a portion of the content area.

By way of further example, a micro-mechanical system for use as an active component may comprise a digital micromirror device (DMD) including an array of micromirrors. Each micromirror may be controllable between a first position in which light incident thereon remains on a propagation axis of the projector and a second position in which light incident thereon is deflected away from the propagation axis of the projector. In more conventional HUD (comprising conventional display such as TFT displays) it is not common to move the projected image on a replay plane. Rather, this is something that has been enabled by holographic HUD, which allows the holographic reconstruction to be moveable/changeable on the replay plane with degradation of image quality. As such, modification of such traditional HUD technologies according to embodiments of the present invention is likely to be infeasible. That is, the present invention does not represent an obvious step away from, or modification of, traditional HUD systems.

The present inventors have recognised that inclusion of an adjustable, i.e. active, mask in accordance with the present invention may, in some cases, introduce significant complexity to the system, which may be considered undesirable. In particular, the method of controlling the active mask may introduce such complexity. However, the present inventors have realised that, advantageously, use of an eye-tracking system or user-tracking system, already present in the picture generating unit for the purpose of determining a position associated with the user, tends to mitigate this complexity. For example, data or indicators associated with the user-tracking system, e.g. outputs of the user-tracking system used to re-position the holographic reconstruction, may be used to also drive the active mask, i.e. to adjust the boundary between the adjustable and non-adjustable area.

Advantageously, the invention according to the above embodiments tends to allow for minimisation of the area of the diffuser exposed to sunlight, thereby mitigating solar back-reflection at the eyebox.

Advantageously, the invention according to the above embodiments tends to allow for one or more regions, e.g. at least some regions, of the noise area, or the entirety of the noise area, to be fully blocked, thereby mitigating or eliminating the "postcard effect".

Advantageously, the invention according to the above embodiments tends to particularly mitigate the undesirable effects of reduced image visibility and loss of contrast.

Furthermore, in cases where an area of the transmissive area, i.e. the shutter aperture, is further restricted, e.g. where there is a dearth of content in edge regions such that the picture area on the replay plane is relatively small in size, the above-outlined advantageous effects tend to be enhanced.

In some embodiments, a reconfigurable shutter according to the present invention may be operated in a mode of operation suitable for protecting the light-receiving surface from light, e.g. sunlight. Such a mode of operation may be considered a "park mode" of the picture generating unit or the holographic projection system. In the park mode, the shutter or mask may be arranged to reduce or substantially eliminate the risk of ambient light (such as sunlight) from being reflected by components of the picture generating unit, such as the light receiving surface. This may prevent reduce the risk of glare.

In park mode, the shutter may be entirely closed, i.e. the transmissive area of the active mask may be reduced to zero.

Alternatively, in park mode, the shutter may be configured to be partially closed, e.g.: 50% closed such that a size (e.g., area or perimeter) of the transmissive area is half that of the transmissive area in a maximally-unrestricted (i.e., fully opened) configuration; or 60% closed such that a size (e.g., area or perimeter) of the transmissive area is 40% that of the transmissive area in a maximally-unrestricted configuration; or 70% closed such that a size (e.g., area or perimeter) of the transmissive area is 30% that of the transmissive area in a maximally-unrestricted configuration; or 80% closed such that a size (e.g., area or perimeter) of the transmissive area is 20% that of the transmissive area in a maximally-unrestricted configuration; or 85% closed such that a size (e.g., area or perimeter) of the transmissive area is 15% that of the transmissive area in a maximally-unrestricted configuration; or 90% closed such that a size (e.g., area or perimeter) of the transmissive area is 10% that of the transmissive area in a maximally-unrestricted configuration; or 95% closed such that a size (e.g., area or perimeter) of the transmissive area is 5% that of the transmissive area in a maximally-unrestricted configuration.

Embodiments according to the present invention which have park mode functionality tend not to be subject to the need to tilt/fold one or more HUD mirrors, which is a conventional means of implementing a diffuser-protecting mode. Thus, advantageously, such embodiments of the present invention tend to provide a picture generating unit or holographic projection system which is more compact and easier to manufacture.

In the above embodiments, the light-receiving surface 502 is a diffuser, but in other embodiments the replay plane may be defined by some other light-receiving surface.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A picture generating unit comprising:

a display device arranged to:

display a hologram of a picture; and spatially modulate light in accordance with the displayed hologram to form a holographic reconstruction of the picture on a replay plane, wherein the holographic reconstruction of the picture comprises a picture area and a non-picture area;

an active mask on or downstream of the replay plane, the active mask comprising:

a propagation area arranged to allow propagation of light along a projection axis of the picture generating unit; and a non-propagation area arranged to prevent propagation of light parallel to the projection axis of the picture generating unit, wherein the propagation area and the non-propagation area share a boundary, the boundary being adjustable such that one or more physical parameters of the propagation area are changeable by adjustment of the boundary;

a drive means arranged to adjust the boundary thereby to change the one or more physical parameters of the propagation area; and a user-tracking system arranged to reposition picture content of the picture based on a determined position of a user, wherein the drive means is arranged to adjust the boundary such that the propagation area of the active mask maintains alignment with the picture area of the holographic reconstruction as the picture area changes position on the replay plane in response to one or more of (i) an input from or via the user-tracking system, (ii) an indication that the picture content has been repositioned by the user-tracking system, (iii) an indicated position of the repositioned picture content, and (iv) one or more user-tracking data processed by the user-tracking system in response to a change in the picture.

2. The picture generating unit of claim 1, wherein the drive means is arranged to adjust the boundary thereby to change at least one of: a size of the active mask, a shape of the active mask, a position of the active mask in the replay plane, and an orientation of the active mask in the replay plane.

3. The picture generating unit of claim 1, wherein the drive means is arranged to adjust the boundary such that said boundary is substantially aligned, along the projection axis, with a further boundary of the picture area of the holographic reconstruction, the further boundary being on the replay plane, thereby to substantially match a value of at least one of the one or more physical parameters of the propagation area with a value of at least one of a further one or more physical parameters of the picture area, wherein the at least one of the one or more physical parameters of the propagation area is a parameter corresponding to the at least one of the further one or more physical parameters of the picture area.

4. The picture generating unit of claim 1, wherein the display device is arranged to:

spatially modulate light in accordance with a first hologram of a first picture to form a first holographic reconstruction of the first picture on the replay plane, the first holographic reconstruction comprising a first picture area and a first non-picture area, at a first time; and spatially modulate light in accordance with a second hologram of a second picture to form a second holographic reconstruction of the second picture on the replay plane, the second holographic reconstruction comprising a second picture area and a second non-picture area, at a second time.

5. The picture generating unit of claim 4, wherein the drive means is arranged to adjust the boundary thereby to change the one or more physical parameters of the propagation area in response to a change in a second further one or more physical parameters of the second picture relative to a change in a first further one or more physical parameters of the first picture.

6. The picture generating unit of claim 5, wherein the drive means is arranged to adjust the boundary thereby to change the one or more physical parameters of the propagation area in response to a change in at least one of a size, a position or an orientation of the second picture area of the second picture relative to that of the first picture area of the first picture.

7. The picture generating unit of claim 4, wherein the drive means is arranged to:

adjust the boundary to be substantially aligned, along the projection axis, with a first further boundary of the first picture area of the first holographic reconstruction when the display device is arranged to spatially modulate light in accordance with the first hologram; and adjust the boundary to be substantially aligned, along the projection axis, with a second further boundary of the second picture area of the second holographic reconstruction when the display device is arranged to spatially modulate light in accordance with the second hologram.

8. The picture generating unit of claim 1, wherein the user-tracking system comprises an eye-tracking system arranged to track a current eye-box position of a user of the picture generating unit.

9. The picture generating unit of claim 8, wherein the picture generating unit is arranged such that the hologram that is displayed on the display device is selected based on the tracked current eye-box position of the user.

10. The picture generating unit of claim 1, wherein the drive means is further arranged to adjust the boundary, thereby to adjust a size of the propagation area to an area less than or equal to that of the non-propagation area, such that the active mask substantially prevents propagation of light along the projection axis of the picture generating unit.

11. A method of operation of a picture generating unit, the method comprising:

displaying, by a display device of the picture generating unit, a hologram of a picture, wherein the picture generating unit comprises a user-tracking system arranged to reposition picture content of the picture based on a determined position of a user;

spatially modulating, by the display device, light in accordance with the displayed hologram to form a holographic reconstruction of the picture on a replay plane, wherein the holographic reconstruction of the picture comprises a picture area and a non-picture area;

adjusting, by a drive means of the picture generating unit, a boundary shared by a propagation area of an active mask of the picture generating unit and a non-propagation area of the active mask of the picture generating unit, the active mask being in or downstream of the replay plane, wherein the propagation area is arranged to allow propagation of light along a projection axis of the picture generating unit, wherein the non-propagation area is arranged to prevent propagation of light along the projection axis of the picture generating unit, and wherein the adjusting the boundary thereby adjusts a physical parameter of the propagation area; and wherein adjusting, by the drive means, the boundary shared between the propagation area of the active mask and the non-propagation area of the active mask comprises adjusting the boundary such that the propagation area of the active mask maintains alignment with the picture area of the holographic reconstruction as the picture area changes position on the replay plane in response to one or more of (i) an input from or via the user-tracking system, (ii) an indication that the picture content has been repositioned by the user-tracking system, (iii) an indicated position of the repositioned picture content, and (iv) one or more user-tracking data processed by the user-tracking system in response to a change in the picture.

12. The method of claim 11, wherein the adjusting, by the drive means, the boundary thereby adjusts at least one of: a size of the active mask, a shape of the active mask, a position of the active mask in the replay plane, and an orientation of the active mask in the replay plane.

13. The method of claim 11, further comprising:

spatially modulating light in accordance with a first hologram of a first picture to form a first holographic reconstruction of the first picture on the replay plane at a first time, the first holographic reconstruction comprising a first picture area and a first non-picture area; and spatially modulating light in accordance with a second hologram of a second picture to form a second holographic reconstruction of the second picture on the replay plane at a second time, the second holographic reconstruction comprising a second picture area and a second non-picture area.

14. The method of claim 13, wherein the adjusting, by the drive means, the boundary comprises adjusting the boundary thereby to change the one or more physical parameters of the propagation area in response to a change in a second further one or more physical parameters of the second picture relative to a change in a first further one or more physical parameters of the first picture.

15. The method of claim 14, wherein the adjusting, by the drive means, the boundary comprises adjusting the boundary thereby to the change one or more physical parameters of the propagation area in response to a change in at least one of a size, a position or an orientation of the second picture area of the second picture relative to that of the first picture area of the first picture.

16. The method of claim 11, further comprising tracking, by a user tracking system of the picture generating unit, a current eye-box position of a user of the picture generating unit.

17. The method of claim 16, further comprising, prior to the displaying, by the display device, the hologram of the picture, selecting, based on the tracked current eye-box position of the user, the hologram of the picture to be displayed.

18. The method of claim 11, wherein the adjusting, by the drive means, the boundary comprises adjusting the boundary thereby to adjust a size the propagation area to an area less than that of the non-propagation area, such that the active mask substantially prevents propagation of light along the projection axis of the picture generating unit.

* * * * *